(12) United States Patent
Schouwink et al.

(10) Patent No.: US 9,817,227 B2
(45) Date of Patent: Nov. 14, 2017

(54) RELAY SET FOR AN ENDOSCOPE AND AN ENDOSCOPE

(71) Applicant: OLYMPUS WINTER & IBE GMBH, Hamburg (DE)

(72) Inventors: Peter Schouwink, Hamburg (DE); Markus Reiser, Hamburg (DE)

(73) Assignee: OLYMPUS WINTER & IBE GMBH, Hamburg (DE)

( * ) Notice: Subject to any disclaimer, the term of this patent is extended or adjusted under 35 U.S.C. 154(b) by 0 days.

(21) Appl. No.: 14/321,131

(22) Filed: Jul. 1, 2014

(65) Prior Publication Data
US 2014/0313578 A1    Oct. 23, 2014

Related U.S. Application Data

(63) Continuation of application No. PCT/EP2012/005227, filed on Dec. 18, 2012.

(30) Foreign Application Priority Data

Jan. 5, 2012    (DE) .......................... 10 2012 200 146

(51) Int. Cl.
G02B 23/24 (2006.01)
G02B 27/00 (2006.01)
G02B 13/00 (2006.01)

(52) U.S. Cl.
CPC ..... G02B 23/2446 (2013.01); G02B 27/0025 (2013.01); G02B 13/0095 (2013.01)

(58) Field of Classification Search
CPC ............ G02B 23/2407; G02B 23/2446; G02B 13/0095; A61B 1/002

(Continued)

(56) References Cited

U.S. PATENT DOCUMENTS 4,907,868 A    3/1990 Kitagishi et al.
5,142,410 A    8/1992 Ono et al.
(Continued)

FOREIGN PATENT DOCUMENTS

CN    101375183 A    2/2009
DE    3838168 A1    5/1989
(Continued)

OTHER PUBLICATIONS

International Search Report dated Apr. 12, 2013 issued in PCT/EP2012/005227.
(Continued)

*Primary Examiner* — Thomas K Pham
*Assistant Examiner* — Nicholas R Pasko
(74) *Attorney, Agent, or Firm* — Scully, Scott, Murphy & Presser, P.C.

(57) ABSTRACT

The invention relates to a relay set for an endoscope that includes a plurality of relay sets of the same type, having two plano-convex rod lenses which face one another with their planar end surfaces, and an achromat that is arranged between these rod lenses, particularly in a central aperture plane of said relay set. Said achromat takes the form of an arrangement of at least two lenses which have different refractive indices and Abbe numbers, and is located at a distance from the rod lenses. The invention also relates to a corresponding endoscope. The claimed relay set is improved in that one lens of said achromat consists of ED glass that has an Abbe number of at least 75, in particular at least 77.

17 Claims, 8 Drawing Sheets

(58) Field of Classification Search
USPC .............. 359/434–435, 648–651, 796–797
See application file for complete search history.

(56) References Cited

U.S. PATENT DOCUMENTS

| | | | |
|---|---|---|---|
| 5,321,447 | A | 6/1994 | Sander et al. |
| 5,575,882 | A | 11/1996 | Holz et al. |
| 5,576,882 | A * | 11/1996 | Kanamori ............... A61B 1/002 359/362 |
| 5,642,225 | A | 6/1997 | Sato |
| 5,793,539 | A | 8/1998 | Konno et al. |
| 6,025,962 | A | 2/2000 | Suzuki |
| 6,226,132 | B1 * | 5/2001 | Abe ........................ G02B 9/02 359/784 |
| 6,236,522 | B1 | 5/2001 | Shimizu |
| 7,002,741 | B2 * | 2/2006 | Lei ..................... G02B 23/2446 359/362 |
| 7,696,291 | B2 * | 4/2010 | Yamamoto .............. C08F 14/18 359/362 |
| 7,724,430 | B2 * | 5/2010 | Kasai .................... A61B 1/002 359/434 |
| 7,733,584 | B2 | 6/2010 | Kazakevich |
| 2002/0057501 | A1 | 5/2002 | Lei |
| 2003/0086184 | A1 | 5/2003 | Abe et al. |
| 2008/0306232 | A1 | 12/2008 | Yamamoto |
| 2010/0014161 | A1 | 1/2010 | Kasai |
| 2013/0194667 | A1 * | 8/2013 | Inoue ................. A61B 1/00163 359/558 |
| 2014/0343362 | A1 * | 11/2014 | Tesar .................. G02B 23/2446 600/181 |

FOREIGN PATENT DOCUMENTS

| | | |
|---|---|---|
| EP | 0582148 A1 | 2/1994 |
| EP | 1978380 A1 | 10/2008 |
| JP | S61-020015 A | 1/1986 |
| JP | 7-117143 A | 5/1995 |
| JP | H07-191265 A | 7/1995 |
| JP | 2000-098221 A | 4/2000 |
| JP | 2003-139916 A | 5/2003 |
| JP | 2004-333768 A | 11/2004 |
| JP | 2010-526342 A | 7/2010 |
| JP | 2013-134474 A | 7/2013 |
| WO | WO 00/54089 A1 | 9/2000 |

OTHER PUBLICATIONS

Chinese Office Action dated Sep. 25, 2015 from related Chinese Patent Application No. 201280065817.6, together with an English language translation.
English-Language Translation of Chinese Office Action dated Sep. 5, 2016 received in Chinese Application No. 201280065817.6.

* cited by examiner

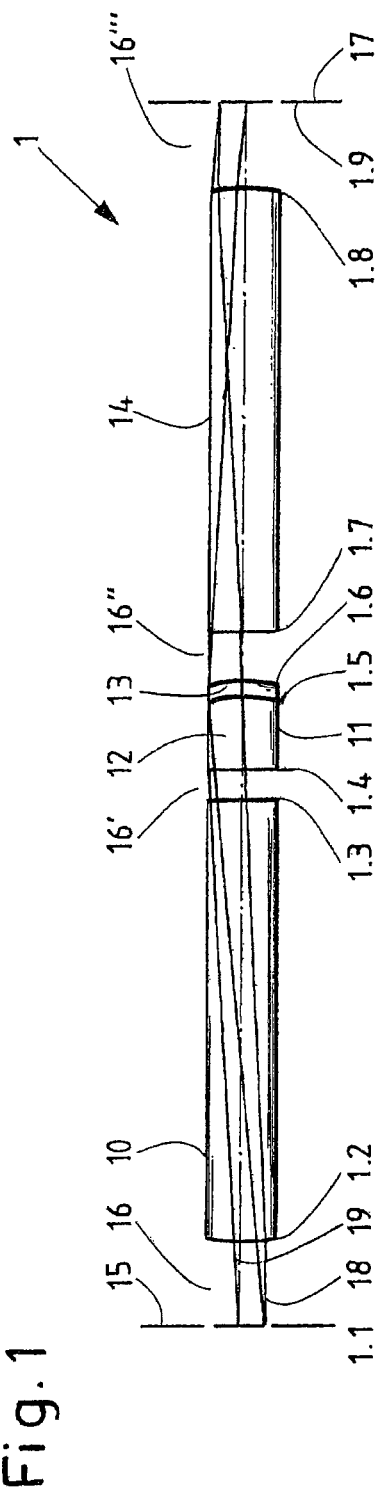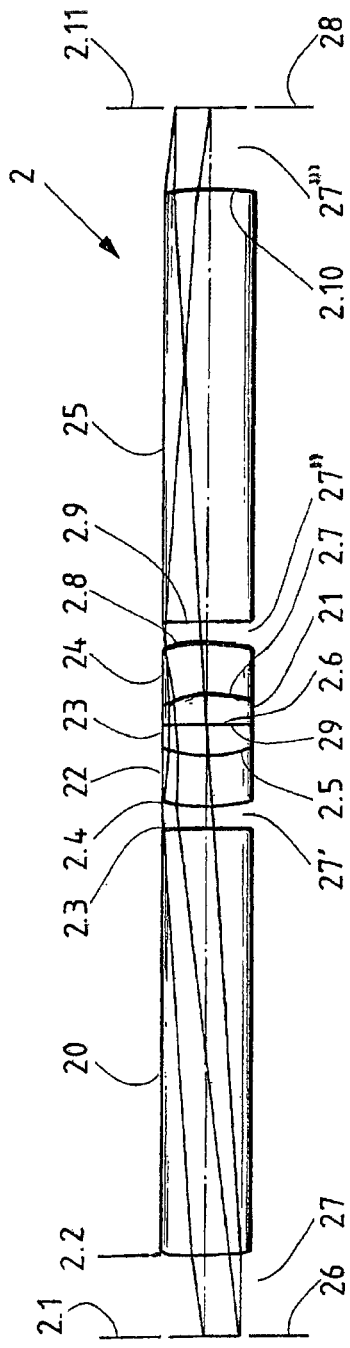

Fig. 4
a)
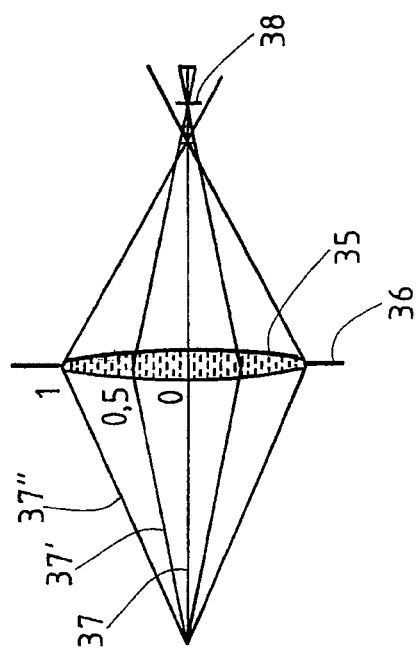
b)
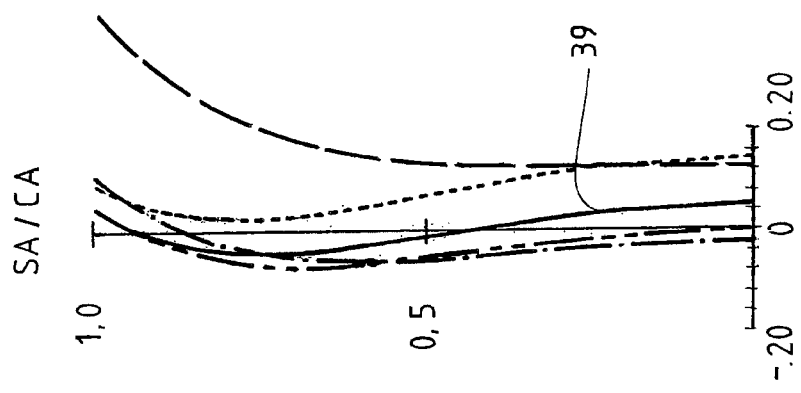

Fig. 5
a)
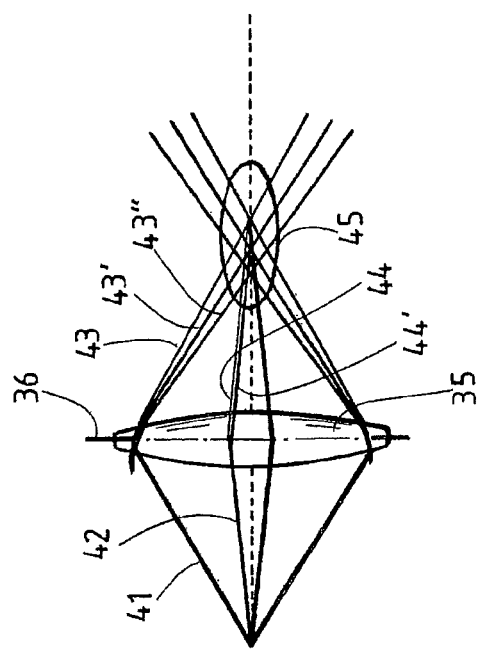
b)
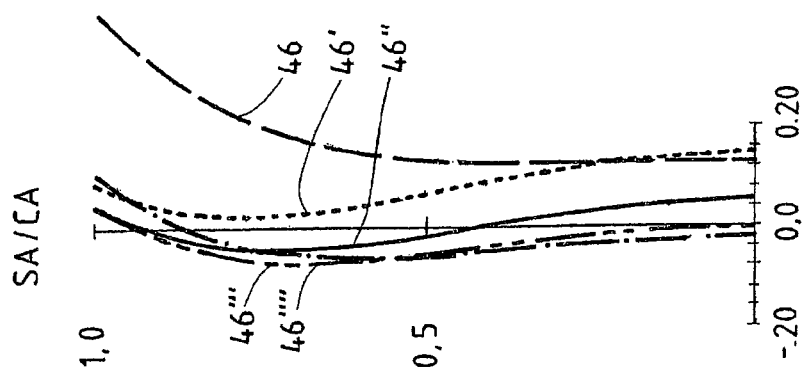

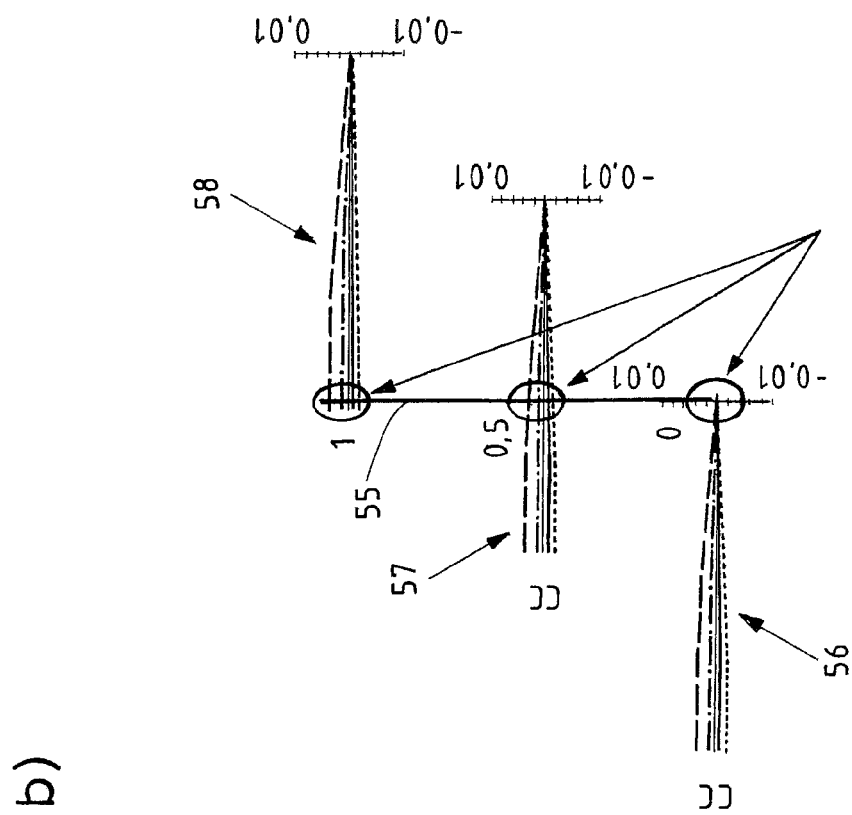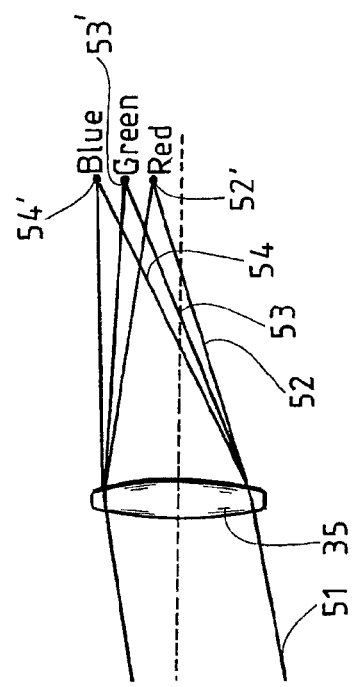
Fig. 6

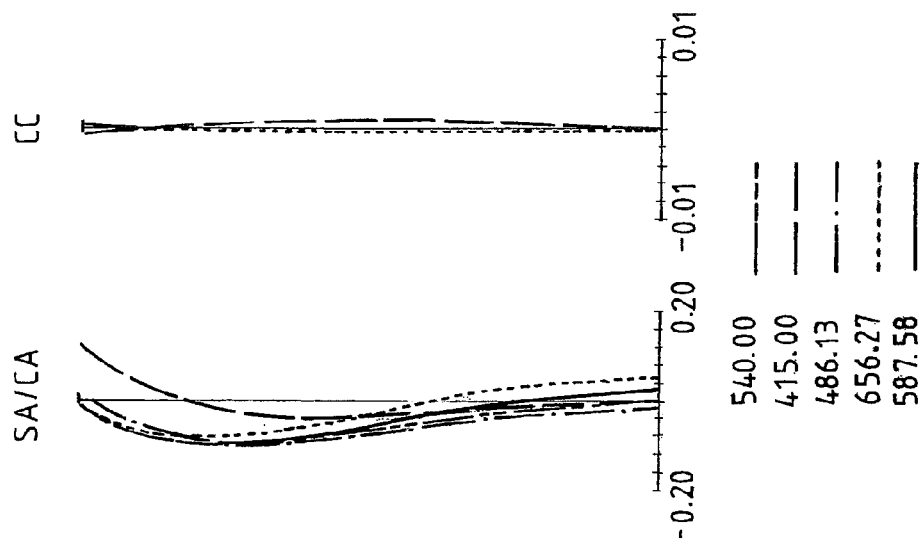
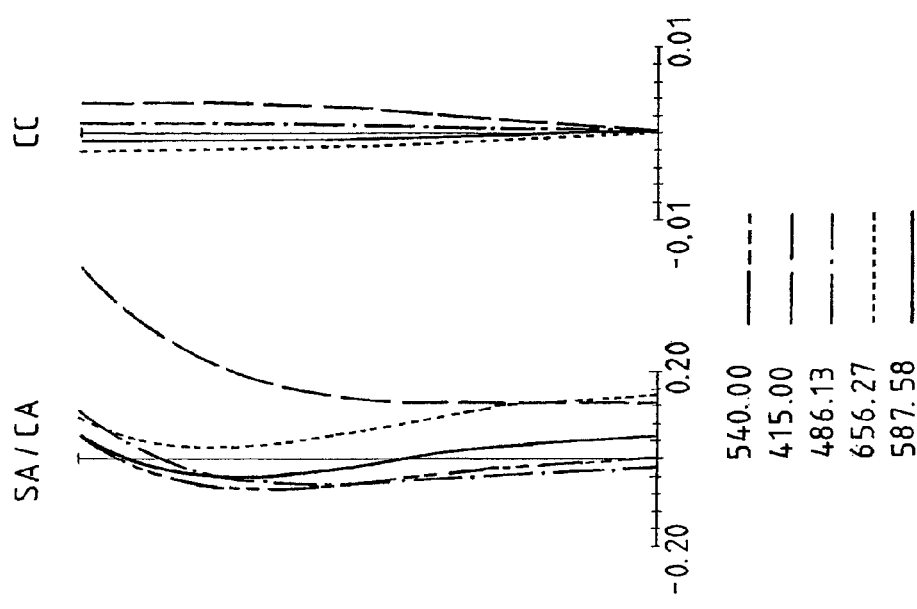
Fig. 7
a)
b)

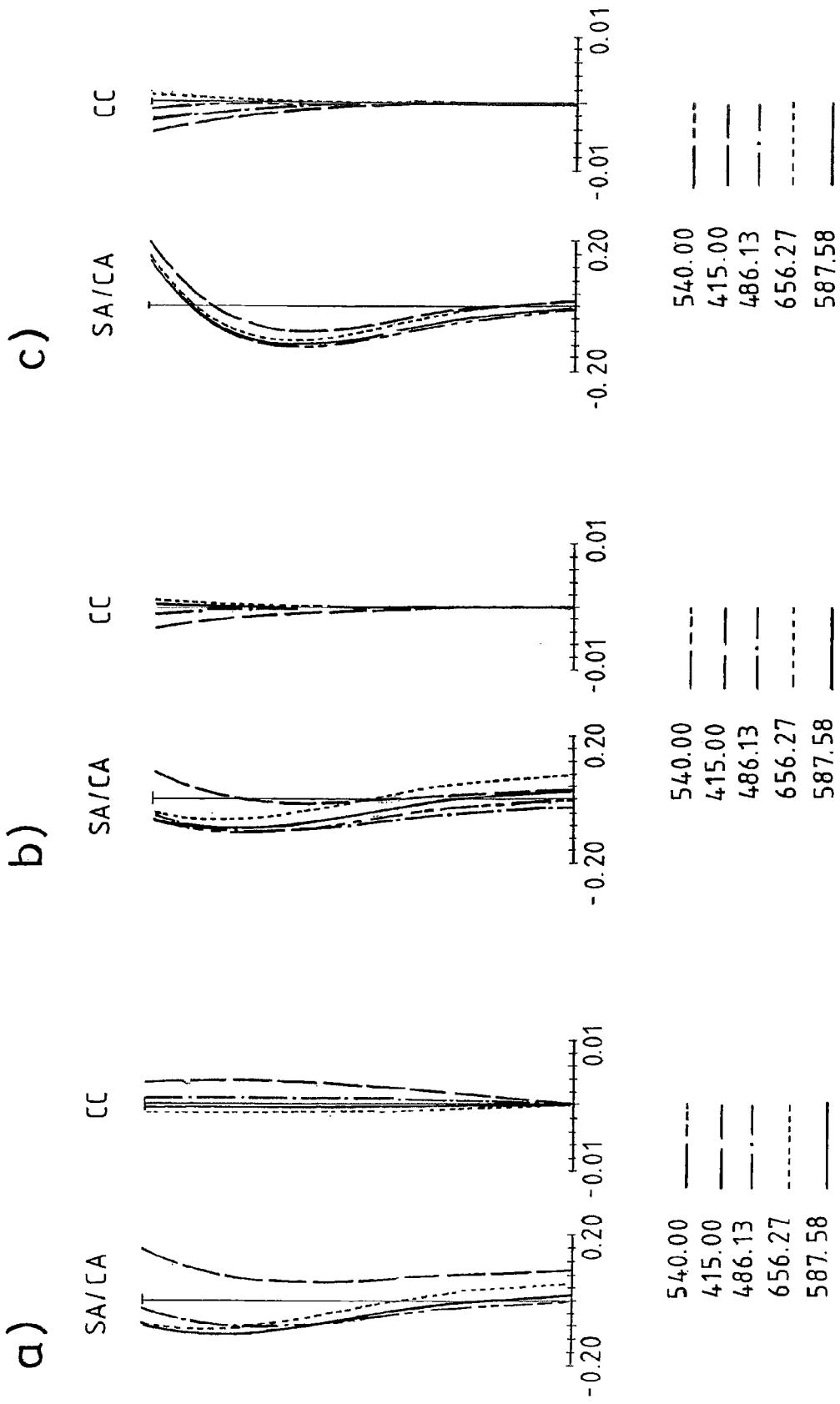

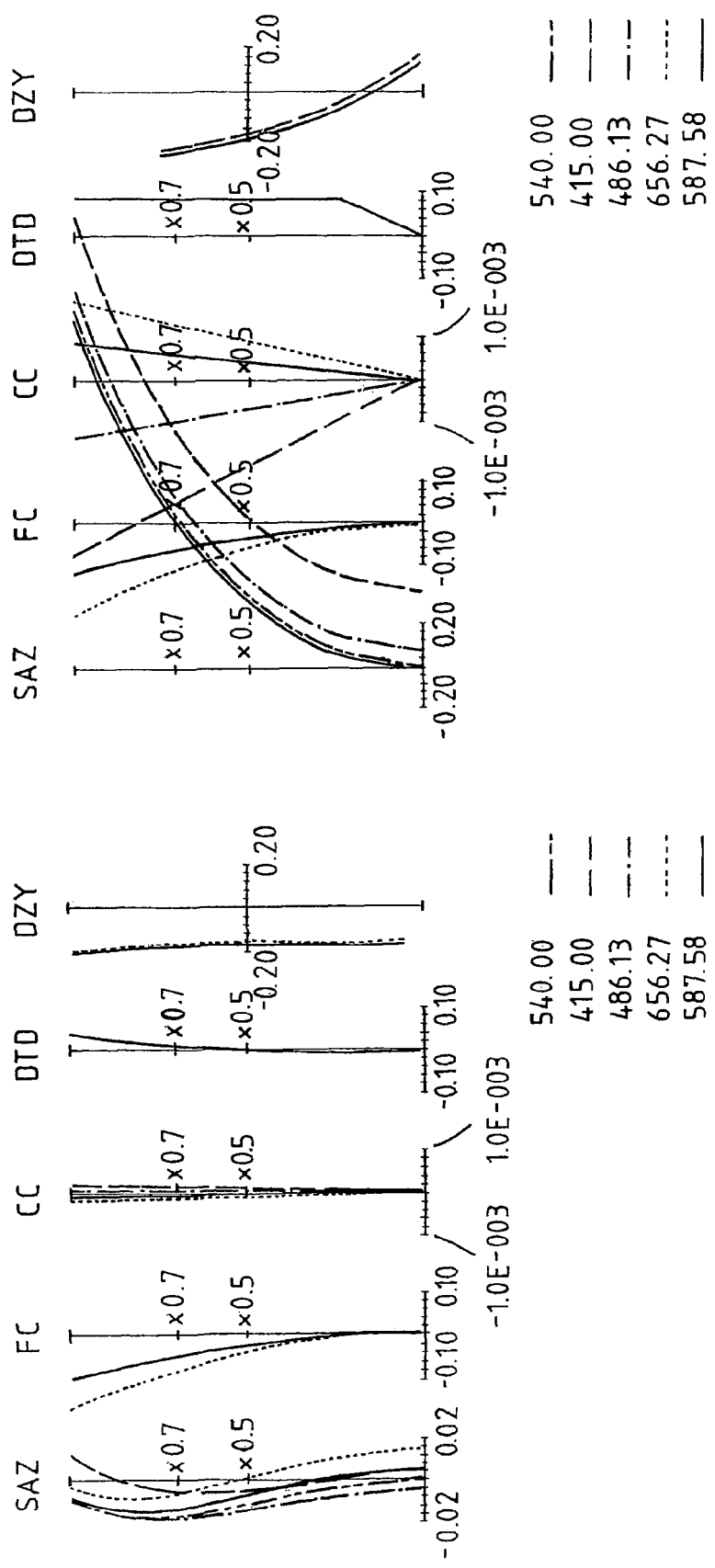

RELAY SET FOR AN ENDOSCOPE AND AN ENDOSCOPE

CROSS-REFERENCE TO RELATED APPLICATION

The present application is a continuation of PCT/EP2012/005227 filed on Dec. 18, 2012, which is based upon and claims the benefit to DE 10 2012 200 146.8 filed on Jan. 5, 2012, the entire contents of each of which are incorporated herein by reference.

BACKGROUND

Field

The invention relates to endoscopes and in particular to a relay set for an endoscope with a plurality of relay sets of the same type, comprising two plano-convex rod lenses which face one another with their planar end surfaces, and an achromat that is arranged between these rod lenses, particularly in a central aperture plane of said relay set, wherein said achromat is designed as an arrangement of at least two lenses which have different refractive indices and Abbe numbers, and is located at a distance from the rod lenses.

Prior Art

Corresponding endoscopes affected by the invention include rigid endoscopes, which have an opening with objective lenses on their distal tip, through which light from an operative field can enter the endoscope. Endoscopes normally also have light conductors or optical fibers next to the rod lens system, with which light from a light source on the proximal end of the endoscope is directed to the distal end in order to illuminate the operative field. Since the relay sets and the optical fibers share the existing space in the endoscope, a compromise must be found between the diameter of the lenses of the relay sets and the available cross-sectional surface for light conductors in order to achieve a maximum image brightness.

Rod lens systems with several relay sets of rod lenses transfer the perceived image to the proximal end of the endoscope, where it is received by an operator through an eyepiece or by means of an image sensor. Since the respective image is inverted in the image planes between the relay sets or respectively rotated by 180°, an odd number of relay sets is generally used. The rod lenses are used in order to direct as much of the light as possible to the eyepiece of the endoscope.

A rigid endoscope with for example 3, 5 or 7 relay sets, which in turn consists respectively of several rod lenses and additional lenses lying in between, thus has a high number of boundary surfaces with air or vacuum gaps or lenses connecting to it with different optical properties. A correction of image errors, called aberrations, is thereby possible. This includes spherical aberration, coma, astigmatism, image field curvature, distortion and color errors, the so-called chromatic aberrations.

Chromatic aberrations result due to the dispersion of optical glasses in that light of different wavelengths is deflected to different degrees. The refractive index of the glass is not a constant but rather a wavelength-dependent function. Simply put, the dispersion describes the steepness of the progression of the refractive index of an optical material.

Axial and lateral chromatic aberrations result from the different degrees of light refraction of different wavelengths of the light. The axial chromatic aberration describes the effect that, in a focusing system, the distance between the respective focus point and the lens system depends on the wavelength. The lateral chromatic aberration describes the wavelength dependency of the enlargement of an object in the image plane. The chromatic aberrations can be partially compensated or reduced through use of lenses with different materials. Thus, the axial chromatic aberration for two wavelengths can be corrected with an achromat. In the case of apochromatic optical systems, the axial chromatic aberration is corrected for three wavelengths. However, the aberration for the wavelengths which are not corrected exactly is thereby reduced as well.

In most cases, the relay sets used in the endoscopes of the applicant of the present patent application have two plano-convex rod lenses which face one another with their planar end surfaces. An achromat, i.e. an optical subassembly made up of several lenses, with which chromatic aberrations are at least partially compensated, is arranged in the gap between the rod lenses. The achromats are usually made up of two or three lenses with different optical properties, above all a different refractive index and different Abbe numbers. The Abbe number V, which is determined as $$V = \frac{n_e - 1}{n_{F'} - n_{C'}} \quad (1)$$

within the framework of the present application from the wavelength-dependent refractive index n of the material, is a measure for the dispersion of the material, wherein a low Abbe number stands for a high dispersion and a high Abbe number stands for a low dispersion. The indices e, F' and C' named in formula (1) stand for the Fraunhofer lines e (light source mercury, wavelength 546.074 nm), F' (cadmium, 479.9914 nm) and C' (cadmium, 643.8469 nm).

In high-quality optical systems, such as e.g. objectives for reflex (SLR) cameras, lenses made of glass with a particularly low dispersion are used to correct chromatic aberrations. In different contexts, these glasses, depending on their Abbe number and on the context, are also called "special low dispersion glass" (SLD glass), "extraordinary low dispersion glass" (ELD glass), "extra-low dispersion glass" (ED glass) or "ultra-low dispersion glass" (UL glass).

In the context of the present invention, these glasses are collectively referred to as "ED glasses". ED glasses to be used within the framework of the invention have an Abbe number of 75 or greater. Fluoride glasses for example have Abbe numbers of approximately 77 or 80 or more. The limits are not clearly defined; different manufacturers offer different ED glasses with different Abbe numbers, which lie for example between 77 and 95. At the same time, such ED glasses have a relatively low refractive index of approx. 1.4 to 1.6 compared to optical glasses.

Since ED glasses are fluoride glasses and other special glasses, which are sensitive to humidity and are also considerably more brittle in their mechanical properties than optical glasses, they are very difficult to handle. Moreover, they are comparatively and considerably more expensive in their production and procurement than optical glasses with lower Abbe numbers. Thus, optical lens systems, which are corrected chromatically, normally just have one lens made of ED glass.

It is also necessary in the case of endoscopes with rod lens relay sets to correct chromatic aberrations. This is done with achromats that have combinations of optical glasses made of crown glass with a comparatively low dispersion and flint glass with a comparatively high dispersion. However, the Abbe numbers of these glasses are lower than those of ED glasses. In known endoscopes of the applicant, a mirror symmetrical triplet of lenses around a central plane is used as the achromat, wherein a central biconcave lens made of crown glass is framed by two biconvex lenses made of flint glass.

Since each of the three to seven relay sets already has at least four or five lenses and lenses for the objective and an ocular are also added, such optical systems for rigid endoscopes are complicated to calculate and to optimize since many different parameters must be set and optimized simultaneously. The replacement for example of the material of a single lens of the optical system generally leads to a strong change in the overall optical properties of the system so that a complete reoptimization is necessary.

U.S. Pat. No. 7,733,584 B2 describes an endoscope that is equipped with an objective and three relay sets, one of which is equipped with plano-convex rod lenses, on the concave boundary surface of which is cemented respectively a biconvex ED lens. The other relay sets do not contain ED glasses. The chromatic aberration of the entire system is corrected with this pair of rod lenses/ED glass lenses combinations. The two additional relay sets do not contain ED glass lenses and are each designed differently from each other and thus respectively individually.

Due to the fact that only three relay sets are used according to U.S. Pat. No. 7,733,584 B2, the already considerably large number of boundary surfaces and materials to be counted is kept relatively small. This concept reaches its limits for longer endoscopes with a greater number of individual relay sets.

SUMMARY

With respect to this state of the art, the object of the present invention is to provide relay sets as well as an endoscope with corresponding relay sets, which are associated with a comparatively lower development effort even in the case of a larger number of relay sets, wherein chromatic aberrations as well as other aberrations of the optical system are limited.

This object is solved by a relay set for an endoscope with a plurality of relay sets of the same type, comprising two plano-convex rod lenses which face one another with their planar end surfaces, and an achromat that is arranged between the rod lenses, particularly in a central aperture plane of said relay set, wherein said achromat takes the form of an arrangement of at least two lenses which have different refractive indices and Abbe numbers, and is located at a distance from the rod lenses, which is further characterized in that a lens of the achromat is made of ED glass, the Abbe number of which is at least 75, in particular at least 77.

This relay set according to the invention is based on the special design of relay sets of the applicant in that it uses two symmetrically arranged, similar rod lenses and arranges an achromat made of two or more lenses between the rod lenses. The achromat is not connected with the rod lenses. Of these relay sets, several similar relay sets are used consecutively in one endoscope. In this case, similar means that the selection of the glasses, the dimensioning of the boundary surfaces and their distances, i.e. the thickness of the lenses and the distances between the lenses, are respectively the same. Through the similarity of the relay sets, the number of variables during the optimization is kept comparatively small and can be calculated with the same optimization effort for 3, 5 or 7 relay sets.

The relay set according to the invention has the further advantage that a very good correction of chromatic aberrations is possible through the use of ED glasses in the achromat in each of the similar relay sets in the endoscope, since chromatic aberrations can be corrected at several locations in the progression of the optical components in the endoscope and thus cannot build up very strongly. With the relay set according to the invention, endoscopes are producible that enable a considerably improved image sharpness up to the edge and a considerably higher contrast image compared to known endoscopes with the same dimensioning. This makes it possible to develop endoscopes with a smaller diameter that can compete optically with conventional endoscopes with larger diameters. These advantages outweigh the extra costs resulting from the increased number of ED glasses in the overall optical system of the endoscope.

The other lens or other lenses of the achromat preferably has or have an Abbe number of less than 75, wherein in particular the other lens or other lenses of the achromat simultaneously has or have a high refractive index and a high Abbe number, wherein in particular the refractive index is greater than 1.8 and the Abbe number is greater than 45. The limitation of the Abbe number of the other lens(es) to less than 75 means that they are glasses that are easier to handle and are cheaper to procure and manufacture. With a maximization of the refractive index and the Abbe number of the other lens or of the other lenses of the achromat given under these conditions, the correction of the chromatic aberrations can be achieved very well.

The achromat is preferably designed as a doublet or a triplet of lenses, wherein in particular in the case of a ratio of the diameter of the lenses of the relay set to the length of the relay set of less than 0.05 the achromat is designed as a doublet, otherwise as a triplet. In the process, the lenses of the doublet or the triplet are preferably cemented together so that the adjacent boundary surfaces of the lenses forming the doublet or the triplet have the same radii of curvature, wherein respectively the one boundary surface is designed as being convex and the associated other boundary surface as being concave. Within the framework of the present invention, a cementing is an adhesion with transparent optical adhesive or respectively optical cement.

The ED glass lens is preferably designed biconvex. This design of the ED glass lens in the achromat results in a good correction of chromatic aberrations in particular in combination with at least one meniscus-shaped additional lens made of an optical glass.

Also preferably, the central, in particular biconvex, lens of the triplet in an achromat designed as a triplet is made of ED glass. This design thus differs from the conventional triplet achromats of the standard design of relay sets of the applicant, in which the central lens for triplets is designed in a biconcave manner. The triplet is particularly preferably designed in a mirror symmetrical manner around a central plane perpendicular to the optical axis, which runs centrally through the central lens of the triplet. With this type of triplet design, in particular the entire relay set is designed around this central plane in a mirror symmetrical manner.

With respect to a doublet achromat, a symmetrical triplet achromat has the advantage that aberrations depending on an odd power of the image height are minimized. These are in particular the color magnification error and the distortion. Due to the higher number of lenses in a triplet, the costs are indeed also slightly higher than for a doublet. In the case of endoscopes with a small diameter, the corresponding aberrations carry less weight so that very good optical results are also achieved with achromats designed as doublets.

An important factor for the production of lenses is the so-called Z-factor. The factor is calculated within the framework of the present invention from the thickness and the diameter of the lens as well as the radii of curvature of the two lens surfaces with the following equation, which applies in particular for convex meniscus lenses:

$$Z = \frac{1}{2}\left|\frac{D_s}{2 \cdot (|R_s| + T)} - \frac{D_l}{2 \cdot |R_l|}\right| \quad (2)$$

In formula (2), $R_s$ is the smaller of the two radii of curvature of the lens and $R_l$ is the larger of the two radii of curvature. $D_s$ denotes the outer diameter of the lens on the side of the boundary surface with the smaller radius of curvature and $D_l$ the diameter of the lens on the side of the boundary surface with the larger radius of curvature. The outer diameters do not normally differ. T is the central thickness of the lens.

Surprisingly, it was found that particularly good optical results and corrections of chromatic aberrations are achieved when preferably at least one lens of the achromat not consisting of ED glass has a Z-factor of less than 0.06, in particular less than 0.04. This facilitates the development for the optics developer since he can limit this parameter.

This selection of the Z-factor also results in that, in contrast to the state of the art, the corresponding lens does not center itself in production during enclosure, as was previously customary, but is henceforth first enclosed and then intricately and manually centered. The optics designers thus kept the Z-factor at a value above 0.06 up until now in order to permit the usual type of enclosure with self-centering.

In the case of the relay set according to the invention, a correction of a chromatic aberration achieved by the achromat of the relay set preferably compensates for a chromatic aberration created by the lenses of the relay set, wherein this correction also compensates in particular additionally for a part of a chromatic aberration created by objective lenses and/or ocular lenses of the endoscope. The objective lenses and the ocular lenses each create respectively a chromatic aberration. In the case of the use of several relay sets according to the invention, the correction, which is allotted to each individual achromat in each individual relay set, can be held relatively low, which keeps the requirements for the design of the achromat and the relay sets within easily controllable limits.

The object underlying the invention is further solved through an endoscope with a plurality of relay sets, wherein the instrument is in particular a laparoscope or uroscope, which is further developed in that several similar relay sets are designed respectively as the relay set according to the invention described above. Such endoscopes have a high contrast and a high sharpness as well as very well corrected, i.e. very small, chromatic aberrations, even in the case of smaller diameters.

Advantageously, at least one additional relay set is designed differently with respect to the other(s), in particular similar amongst themselves, relay sets, wherein the differently designed relay set in turn is a relay set according to the invention described above. This at least one additional relay set is designed in particular to correct the chromatic aberration caused by the lenses of the objective and/or the ocular of the endoscope so that the achromats of the other, similar amongst themselves, relay sets only need to correct the chromatic aberration of the respective own relay set.

With the endoscope according to the invention and the relay sets according to the invention, a considerably higher contrast and a considerably higher sharpness as well as a considerably stronger reduction in chromatic aberrations can be achieved with the same dimensioning of the endoscope, which is a great advantage in particular for endoscopes with a small diameter, such as in particular uroscopes. The trend is thus supported, which goes from endoscopes with a relatively large diameter, for example 10 mm, to endoscopes with a smaller diameter, for example to endoscopes with diameters of 5.4 mm or 4.0 mm.

Further features of the invention will become apparent from the description of the embodiments according to the invention together with the claims and the included drawings. Embodiments according to the invention can fulfil individual characteristics or a combination of several characteristics.

BRIEF DESCRIPTION OF THE DRAWINGS

The invention is described below, without restricting the general idea of the invention, based on exemplary embodiments in reference to the drawings, whereby we expressly refer to the drawings with regard to the disclosure of all details according to the invention that are not explained in greater detail in the text. The figures show:

FIG. 1 illustrates a schematic representation of a relay set according to the invention with doublet achromat, FIG. 2 illustrates a schematic representation of a relay set according to the invention with triplet achromat, FIGS. 4a and 4b illustrate explanatory sketches for the spherical aberration, FIGS. 5a and 5b illustrate explanatory sketches for the axial chromatic aberration, FIGS. 6a and 6b illustrate explanatory sketches for the lateral chromatic aberration, FIGS. 7a and 7b illustrate a comparison of the spherical aberration, axial and lateral chromatic aberration for a conventional relay set with doublet achromats without and with ED glass, FIGS. 8a, 8b and 8c illustrate spherical, axial chromatic and lateral chromatic aberrations for doublet achromat relay set with different Z-factors of the ED glass as well as for a relay set according to the invention with triplet achromat and FIGS. 9a and 9b illustrate a comparison of different aberrations for similarly dimensioned relay sets with different ED glasses.

DETAILED DESCRIPTION

Figure 3:
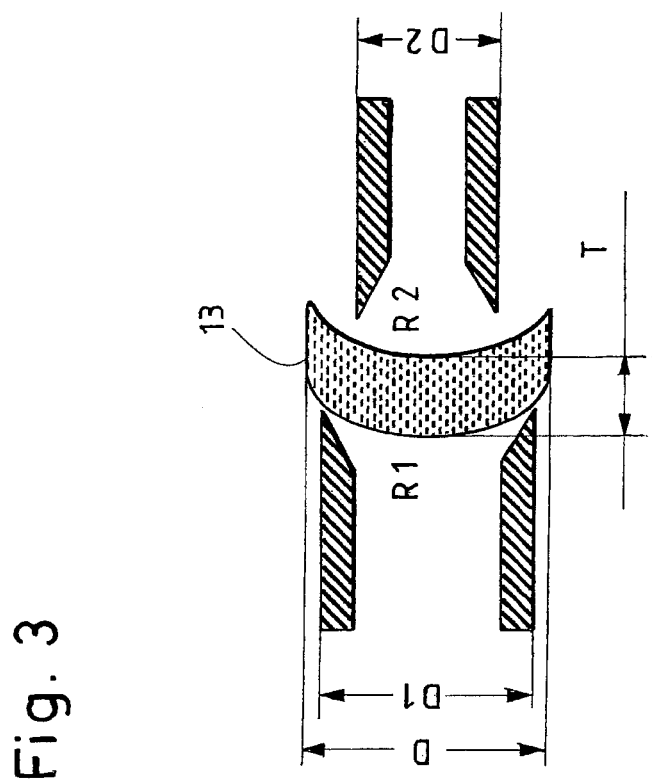
FIG. 3 illustrates an explanatory sketch with respect to the definition of the Z-factor.

In the drawings, the same or similar types of elements and/or parts are provided with the same reference numbers so that a corresponding re-introduction is omitted.

FIG. 1 shows schematically a first relay set 1 according to the invention for an endoscope. A typical endoscope contains an odd number of such relay sets 1, for example 3, 5 or 7. The relay set 1 reaches from a first image plane 1.1 up to a second image plane 1.9, to which another, in particular similar, relay set or an ocular or eyepiece connects. The image, which is present in the image plane 1.1, is shown inverted on the image plane 1.9. This is an inversion, i.e. a mirroring with respect to the middle point, i.e. the optical axis. This inversion is the same as a 180° rotation around the optical axis.

After a first gap 16, a plano-convex rod lens 10 connects to the first image plane 1.1, the convex boundary surface 1.1 of which faces the first image plane 1.1, while the planar boundary surface 1.3 faces an achromat 11, from which it is separated by a gap 16'. The achromat 11 consists of a doublet made of a biconvex lens 12 made of ED glass with a high Abbe number with boundary surfaces 1.4 and 1.5, to which a meniscus lens 13 made of optical glass connects, which is designed in its boundary surfaces 1.5 and 1.6 as a concave meniscus. The lenses 12 and 13 are cemented together at the joint boundary surface 1.5. After an additional gap 16", an additional plano-convex rod lens 14 is connected, the planar boundary surface 1.7 of which faces the achromat 11, while the convex boundary surface 1.8 faces the second image plane 1.9, from which it is separated by a gap 16'.

An exemplary dimensioning of the lenses according to the invention as well as the selection of the glasses to be used for this arrangement is shown in Table 1 for the example of an endoscope with an outer diameter of 4.0 mm. The half diameter or respectively the radius of the lenses, not be confused with the radius of curvature of the boundary surfaces, is 1.329 mm, which still leaves room for optical fibers to illuminate the operative field. The length of the relay set is a total of 61.801 mm from image plane 1.1 to image plane 1.9. The ratio of the half diameter to the length of the relay set is approximately 0.043.

The glasses used in this design can all be obtained from Ohara GmbH. Types include S-BAL35 (refractive index 1.591, Abbe number 60.88), S-FPL51 (refractive index 1.498, Abbe number 81.14) as ED glass and S-LAH55 (refractive index 1.839, Abbe number 42.47) as additional glass of the achromat. Other manufacturers also offer corresponding glasses.

TABLE 1

Relay set endoscope 4.0 mm

| Area no. | Radius of curvature (mm) | Thickness (mm) | Refractive index n | Abbe number V | Radius (mm) |
|---|---|---|---|---|---|
| 1.1 | ∞ | 4.397 | 1.000 | Air | 1.000 |
| 1.2 | 10.4304 | 22.209 | 1.591 | 60.88 | 1.329 |
| 1.3 | ∞ | 1.564 | 1.000 | Air | 1.329 |
| 1.4 | 11.0593 | 3.763 | 1.498 | 81.14 | 1.329 |
| 1.5 | −3.8006 | 0.767 | 1.839 | 42.47 | 1.329 |
| 1.6 | −6.3169 | 2.495 | 1.000 | Air | 1.329 |
| 1.7 | ∞ | 22.209 | 1.591 | 60.88 | 1.329 |
| 1.8 | −10.4304 | 4.397 | 1.000 | Air | 1.329 |
| 1.9 | ∞ | N/A | 1.000 | Air | 1.000 |

The Z-factor according to formula (2) for the non-ED lens 13 with the boundary surfaces 1.5 and 1.6 is approx. 0.04.

FIG. 2 shows an alternative relay set 2 according to the invention. It reaches from a first image plane 2.1 to a second image plane 2.11 and comprises, through holes 27, 27', 27" and 27‴ spaced from one another, two plano-convex rod lenses 20, 25, each of which face the two image planes 2.1 and 2.11 with their convex boundary surface 2.2 and 2.10 and the planar boundary surfaces 2.3 and 2.9 of which face each other. An achromat 21 designed as a triplet, which comprises three lenses 22, 23, 24, is located between the two rod lenses 20, 25.

The achromat 21 is designed symmetrically around a central plane 2.6. The two symmetrical convex-concave lenses 22, 24 consist of an optical glass; the central biconvex lens 23 consists of an ED glass. The central symmetry plane 2.6 does not form a boundary surface.

Both the achromat 11 according to FIG. 1 as well as the achromat 21 according to FIG. 2 consists of lenses cemented together. However, the optics developer is free to also provide gaps here between the lenses of the achromat.

The achromat 21 from FIG. 2 differs from the conventional triplet achromats in the case of corresponding relay sets of the applicant not only in the selection of the material but also in that the central lens is designed in a biconvex manner, while the central lenses of triplet achromats in the case of corresponding relay sets of the applicant were biconcave up to now. Accordingly, the two additional lenses according to the state of the art are respectively biconvex.

An exemplary dimensioning of the lenses according to the invention as well as the selection of the glasses to be used for the arrangement according to FIG. 2 is shown in Table 2 for the example of a laparoscope with an outer diameter of 5.4 mm. The half diameter of the lenses is 1.277 mm, which still leaves room for optical fibers to illuminate the operative field. The length of the relay set is a total of 46.072 mm from image plane 2.1 to image plane 2.11. The ratio of the half diameter to the length of the relay set is approximately 0.055.

The glasses used in this design can also all be obtained amongst others from Ohara GmbH. Types again include S-BAL35 (refractive index 1.591, Abbe number 60.88), S-FPL51 (refractive index 1.498, Abbe number 81.14) as ED glass. The additional glass of the achromat is indeed of type S-LAH59 (refractive index 1.820, Abbe number 46.37).

TABLE 2

Relay set laparoscope 5.4 mm

| Area no. | Radius of curvature (mm) | Thickness (mm) | Refractive index n | Abbe number V | Radius (mm) |
|---|---|---|---|---|---|
| 2.1 | ∞ | 3.094 | 1.000 | Air | 1.000 |
| 2.2 | 7.9827 | 16.050 | 1.591 | 60.88 | 1.277 |
| 2.3 | ∞ | 0.820 | 1.000 | Air | 1.277 |
| 2.4 | 4.6352 | 1.899 | 1.820 | 46.37 | 1.277 |
| 2.5 | 2.5914 | 1.173 | 1.498 | 81.14 | 1.277 |
| 2.6 | ∞ | 1.173 | 1.498 | 81.14 | 1.277 |
| 2.7 | −2.5914 | 1.899 | 1.820 | 46.37 | 1.277 |
| 2.8 | −4.6352 | 0.820 | 1.000 | Air | 1.277 |
| 2.9 | ∞ | 16.050 | 1.591 | 60.88 | 1.277 |
| 2.10 | −7.9827 | 3.094 | 1.000 | Air | 1.277 |
| 2.11 | ∞ | N/A | 1.000 | Air | 1.000 |

FIG. 3 shows a convex-concave lens, for example the lens 13 from FIG. 1 together with definitions for the dimensioning which are significant for the calculation of the Z-factor according to formula (2). The lens 13 comprises two optical boundary surfaces, which are designed in particular spherically. They have radii of curvature R1 and R2, respectively. For the calculation of the Z-factor according to formula (2), the larger radius of curvature is $R_l$ and the smaller radius of curvature is $R_s$.

The lens 13 shown in FIG. 3 has a uniform outer diameter D. In individual cases, the outer diameter can however differ on both sides of the lens. Thus, for the formula, a diameter D1 is assumed for the side with the radius of curvature R1 and an outer diameter D2 is assumed for the side with the radius of curvature R2. With respect to the aforementioned formula (2) for the calculation of the Z-factor, the diameter belonging to the side with the smaller radius of curvature is labelled with $D_s$ while the outer diameter $D_l$ is the one relating to the side with the larger radius of curvature. Moreover, the central thickness of the lens 13 along the optical axis is labelled with T.

In the following FIGS. 4 to 6, some principles of the chromatic and other aberrations are briefly sketched and explained.

FIG. 4a shows a beam of rays originating from a point on an optical axis of a collective lens 35, which is enclosed in an aperture 36. A light beam 37 progresses through the optical axis according to aperture height 0. Two light beams 37' progress through aperture height 0.5 of the collective lens 35 and two other light beams 37" progress through the outermost edge of the collective lens 35 at aperture height 1.

The spherical aberration of this type of lens is expressed in that in the area near the optical axis the corresponding light beams are bundled in an image point 38 in the case of a certain distance from the lens 35. Light beams 37", which pass through the collective lens 35 further outside, i.e. in the case of a larger aperture height, are bent more strongly and cross the optical axis in a point in front of the image point 38. It is hereby assumed in FIG. 4a that the corresponding light beams 37 to 37" are monochromatic and of the same wavelength. These spherical aberrations lead to the fact that an object point is not displayed over the entire surface of the collective lens 35 in the same image plane or respectively the same image point 38 so that an image point in the plane that comprises the image point 38 becomes a spot with a certain size. This effect reduces the sharpness of the image and can be improved for example through reduction of the aperture, but this reduces the light efficiency and the achievable resolution.

FIG. 4b shows the so-called "spherochromatism" (abbreviation as "SA/CA" for the spherical aberration "SA" and the axial chromatic aberration "CA"), namely the progression of the distance between the image point and paraxial image point depending on the aperture height and the wavelength of the light. A separate progression of the spherical aberration results for each individual wavelength. The progressions shown in FIG. 4b do not correspond with those for an individual lens as shown in FIG. 4a, but rather for an exemplary relay set.

On the X-axis of the spherochromatism shown in FIG. 4b, the deviation from the paraxial image point for a reference wavelength represented on the Y-axis is the aperture height that runs from 0 to 1, according to the aperture height which is shown in FIG. 4a. The individual curves correspond to the progressions for the different wavelengths.

In the following, the individual curve 39 is singled out briefly for an individual wavelength, on which this progression is shown as an example. For this wavelength, the image point at aperture height 0 is approximately 0.06 mm from the paraxial image point. In the case of an increasing aperture height, this distance decreases and reverses itself to a negative above approximately 0.5 in order to switch in turn to a positive above approximately 0.9. Overall, the spherical aberration is thus fairly well corrected for this wavelength. The two long or respectively short dashed lines on the right side for positive values on the X-axis correspond to wavelengths that are in the blue or respectively red area and have correspondingly greater deviations of the image point from the paraxial image point for the optimized wavelength.

FIG. 5a shows a similar situation like in FIG. 4a; however, in this case, polychromatic light beams 41, 42 are shown at full aperture height and at low aperture height. After the passage through the collective lens 35, the respective light beam 41, 42 is expanded spectrally due to the dispersion of the material. This occurs most distinctly at a high aperture height, wherein the resulting beams 43, 43', 43" in this order represent red light, green light and blue light, wherein blue light is deflected the strongest. Accordingly, these different wavelengths are focused at different positions along the optical axis. For the light beam 42 that passes through the collective lens 35 in the case of a lower aperture height, the corresponding dispersive expansion is less strong.

FIG. 5b shows the same graph as in FIG. 4b, but the attention here is directed at the different wavelengths. Thus, the graphs 46 to 46"" are the graphs of the spherical aberrations, i.e. the difference between image point and paraxial image point depending on the image height for different wavelengths. The corresponding wavelengths thereby correspond with the normally used Fraunhofer lines. It can be seen for example that the line 46 for blue light is at a fairly large distance from the paraxial image point. A positive difference to the paraxial image point tends to be observed in the case of high values of the aperture height for all wavelengths.

The chromatic aberration shown in FIG. 5 is an axial chromatic aberration since the object points are arranged respectively on the optical axis of the lens system.

FIG. 6 sketches the effect of the lateral chromatic aberration. FIG. 6a) shows a collecting lens 35, onto which a polychromatic parallel light beam 51 falls diagonally, i.e. under an angle to the optical axis of the lens. Due to the dispersion of the glass material, different wavelengths are in turn deflected to different degrees so that different light beams 52, 53 and 54 result for the colors blue, green and red and accordingly different image points or respectively focus points 52', 53', 54' in the case of different image heights. This means that an object appears more enlarged (or less reduced) in the blue range than in the red range. This effect is amplified with an increasing image height and disappears completely in the case of an axially hitting light beam.

Accordingly, the lateral chromatic aberration ("CC") is plotted in FIG. 6b depending on the image height. The thick vertical line is the image height that runs from 0, i.e. centrally, to 1, i.e. to the edge of the image plane. Reference numbers 56, 57 and 58 show the graphs that represent the deviation from the illustration of the reference wavelength for central light beams, for light beams in the case of half the image height and for light beams in the case of a full image height. In this case, this deviation is shown in a coordinate system on the X-axis of −0.01 to 0.01, wherein these coordinate systems have been rotated by 90° for clarity.

The Y-axis, which is horizontal in FIG. 6b, in turn shows the image height. Accordingly, it can be seen that the chromatic lateral aberration disappears in the case of 56 at image height 0. For half the image height in the case of reference number 57, the wavelength-dependent lateral chromatic aberration is already considerably developed and increases even more in the case of reference number 58 for a full image height.

The chromatic aberrations shown in FIGS. 4 to 6 are to be minimized during the development of a relay set for an endoscope, wherein the aberrations shown in FIG. 6 do not occur in the case of symmetrical achromats. Other aberrations are also to be corrected simultaneously, like spherical aberration, coma, astigmatism, image field curvature and, if applicable, distortion and deformation of the image.

In FIGS. 7a and 7b, the graph bundles introduced in FIGS. 4 to 6 for the spherochromatism and the lateral chromatic aberration in the case of the use of relay sets with respectively one achromat designed as a doublet according to FIG. 1 are shown and compared with each other. A significant difference exists in that no ED glass is contained in the achromat according to FIG. 7a and FIG. 7b uses an ED glass in the doublet of the achromat.

It is clear that the graph bundle in the respective left system, which describes the spherochromatism, is bundled in a considerably stronger manner in the case of FIG. 7b with the use of ED glass and the deviations from the zero point on the X-axis have become considerably smaller. This represents a significant improvement in the spherochromatism with respect to the known state of the art. The lateral chromatic aberration has also simultaneously dropped to a fraction of the previously achievable value.

The respective legends for the wavelengths of the Fraunhofer lines, which are shown in the graphs, are specified below the coordinate systems. These wavelengths are specified in nanometers.

The system shown in FIG. 7a corresponds to a standard uroscope of the applicant with a diameter of 4.0 mm with five conventional relay sets. The system shown in FIG. 7b is based on this known system, wherein however the ED glass S-FPL53 from Ohara GmbH with an Abbe number of 95.0 was used and the system was preliminarily optimized accordingly.

In FIGS. 8a to 8c, spherochromatism and lateral chromatic aberration are compared with each other in the case of use for three different relay sets.

FIGS. 8a and 8b are based on endoscopes with a diameter of 4.0 mm and five relay sets with doublet achromats. The material FCD1 from Hoya is used respectively as ED glass in the doublet, which is comparable in its optical properties with S-FPL51 from Ohara GmbH. In this case, the non-ED glass is S-LAM52 from Ohara GmbH (refractive index 1.720, Abbe number 43.7). The systems according to FIGS. 8a and 8b differ in the Z-factor of the non-ED glass lens, which is 0.06 in the system according to FIGS. 8a and 0.037 in FIG. 8b. A clear improvement in the spherochromatism and the lateral chromatic aberration results through the reduction of the Z-factor. This goes along with the need for an adjusted enclosure and centering during the production of the corresponding non-ED glass lens.

FIG. 8c shows the graphs for spherochromatism ("SA/CA") and lateral chromatic aberrations ("CC") for a laparoscope with 5.4 mm diameter and a triplet achromat with central ED glass lens. A very good correction of the axial chromatic aberration is achievable with this system, which can be seen in that the lines of the spherochromatism diagram have come very close together for the different wavelengths. Thus, this is a comparatively small, almost wavelength-independent spherical aberration, which moves within an acceptable range. The lateral chromatic aberration in the right diagram is also very small and only differs at all from 0 in the case of image heights above approximately 0.6. The ED material in triplet according to FIG. 8c is S-FPL51 from Ohara.

The diagrams shown in FIGS. 7 and 8 are respectively for systems with five relay sets and entry optics and exit optics.

The modulation transfer function, which specifies the resolution of the optical system in the radial and tangential direction depending on the image height in the unit for 80 line pairs/mm (lp/mm), is as follows for the optical systems shown in FIGS. 8a and 8b (values specified respectively radially/tangentially), wherein the optimal values achievable while taking the image field curvature into consideration are specified:

TABLE 3

| MTF (80 lp/mm) for doublet achromats with a different Z-factor | | | | | |
|---|---|---|---|---|---|
| Image height | 0.0 | 0.5 | 0.8 | 0.9 | 1.0 |
| FIG. 8a) | 57.2/57.2 | 54.6/50.0 | 56.1/39.6 | 57.0/35.2 | 57.9/28.7 |
| FIG. 8b) | 60.0/60.0 | 57.8/57.7 | 59.7/56.2 | 59.1/54.9 | 58.2/51.9 |

The improvement in the MTF in the case of a small Z-factor is obvious in Table 3 in particular for tangential structures in the border area.

In the case of a change in the design of a relay set for an endoscope, on which the comparisons in FIGS. 7 and 8 are based, the start point is usually represented by an existing system, which is similar to the new planned system, for example a previous model. The new parameters are changed accordingly for the new system; for example the lens diameter is increased or decreased or, in the case of ED glass, the glass material is replaced. This results in a dramatic change in the image quality, as shown in FIG. 9.

A first preliminary optimization is performed afterwards, with which the parameters like enlargement and image position, spherical aberration, astigmatism etc. are brought into acceptable ranges. Since the different image errors behave for the most part in opposite manners, it is then attempted to find a good compromise. For example, it is first attempted to reduce the spherical aberration. If it is then determined that for example the lateral chromatic error thereby increases in an unacceptable manner, it is weighted again more heavily in the optimization function. If for example the axial chromatic aberration then increases, this in turn is weighted more heavily. Between these steps, the optics designer continues to influence the optimization in that he selects or blocks for example the variable parameters or changes manually determined values in order to move the system in a certain direction.

In a closing process, the optics designer also manually changes if applicable radii or thicknesses in order to work out the last improvements.

Until an optimal compromise is found, dozens to hundreds of iterative steps and several weeks of development work are needed depending on the complexity, qualitative requirement and problem of producibility.

In order to clarify this task, FIGS. 9a and 9b show a comparison in which an identically dimensioned relay set with doublet achromat is equipped with two different ED glasses, namely in FIG. 9a with S-FPL51 from Ohara and in FIG. 9b with S-FPL53 from Ohara. The Abbe number thereby changes from 81.6 to 95.0 and the refractive index from 1.495 to 1.437. The system was calculated and optimized for the material S-FPL51.

The comparison with the same system with the one different material shows that all image properties, including the chromatic aberration, spherical aberration and other properties like coma or image field curvature, run out of control due to this one change. This shows that the selection of the glass types must be made very carefully and must also involve a readjustment of the relay set.

All named characteristics, including those taken from the drawings alone, and individual characteristics, which are disclosed in combination with other characteristics, are considered individually and in combination as essential to the invention. Embodiments according to the invention can be realized by the individual features, or a combination of several features.

LIST OF REFERENCES 1, 2 Relay set
1.1-1.9 Image and boundary areas of the relay set 1
2.1-2.11 Image and boundary areas of the relay set 2
10 Plano-convex rod lens
11 Doublet achromat
12 Lens made of ED glass
13 Lens made of optical glass
14 Plano-convex rod lens
15 Image plane
16-16' Gap
17 Image plane
18 Central beam of rays
19 Peripheral beam of rays
20 Plano-convex rod lens
21 Triplet achromat
22 Lens made of optical glass
23 Lens made of ED glass
24 Lens made of optical glass
25 Plano-convex rod lens
26 Image plane
27-27' Gap
28 Image plane
29 Aperture plane
30 Central beam of rays
31 Peripheral beam of rays
35 Collective lens
36 Aperture
37-37" Light beam
38 Image point
39 Graph of the aberration for a wavelength
41, 42 Polychromatic light beam
43 Red light
43' Green light
43" Blue light
44 Red light
44' Blue light
45 Distribution of the wave- and aperture-position-dependent focus points
46-46"" Graph of the aberration for a wavelength
51 Diagonally incoming light beam
52 Bundled red light
52' Focus point of the red light
53 Bundled green light
53' Focus point of the green light
54 Bundled blue light
54' Focus point of the blue light
55 Image plane
56 Deviation for illustration of the reference wavelength for central light beams
57 Deviation for illustration of the reference wavelength for light beams with half the image height
58 Deviation for illustration of the reference wavelength for light beams with full image height
D Outer diameter
D1 Diameter on the first side
D2 Diameter on the second side
R1 Radius of curvature on the first side
R2 Radius of curvature on the second side
T Thickness of the lens
SA Spherical aberration
CA Chromatic aberration
MTF Modulation transfer function

What is claimed is:

1. A relay set for an endoscope with a plurality of relay sets of the same type, the relay set comprising:
    two plano-convex rod lenses which face one another with their planar end surfaces; and
    an achromat arranged between the rod lenses, wherein the achromat is configured as an arrangement of at least two lenses which have different refractive indices and Abbe numbers, and is located at a distance from the rod lenses;
    wherein a lens of the achromat is made of extra-low dispersion glass (ED glass), wherein the ED glass is glass having an Abbe number of at least 75.

2. The relay set according to claim 1, wherein at least one other lens of the achromat has an Abbe number of less than 75.

3. The relay set according to claim 1, wherein the achromat is configured as one of a doublet or triplet of lenses.

4. The relay set according to claim 1, wherein the achromat comprises at least one lens not made of ED glass, the at least one lens having a Z-factor of less than 0.06, wherein the Z-factor is determined by the formula $$Z = \frac{1}{2}\left|\frac{D_s}{2\cdot(|R_s|+T)} - \frac{D_l}{2\cdot|R_l|}\right|$$

wherein, $R_s$ is the smaller of two radii of curvature of the at least one lens, $R_l$ is the larger of the two radii of curvature, $D_s$ is an outer diameter of the at least one lens on the side of the boundary surface with the smaller radius of curvature, $D_l$ is the diameter of the at least one lens on the side of the boundary surface with the larger radius of curvature, and T is the central thickness of the at least one lens.

5. The relay set according to claim 1, wherein a correction of a chromatic aberration achieved by the achromat of the relay set compensates for a chromatic aberration created by the lenses of the relay set.

6. The relay set according to claim 1, wherein the achromat is arranged between the rod lenses such that the achromat crosses a central aperture plane of said relay set.

7. The relay set according to claim 1, wherein the lens of the achromat is made of an ED glass, wherein the ED glass is a glass having a Abbe number of at least 77.

8. An endoscope comprising a plurality of relay sets, wherein each of the plurality of relay sets are identical to the relay set of claim 1.

9. The relay set according to claim 2, wherein the at least one other lens of the achromat simultaneously has a refractive index greater than 1.8 and the Abbe number greater than 45.

10. The relay set according to claim 3, wherein the ED glass lens is biconvex.

11. The relay set according to claim 3, wherein, in the achromat configured as a triplet, a central lens of the triplet is made of ED glass.

12. The relay set according to claim 3, wherein if a ratio of a diameter of the lenses of the relay set to an entire length of the relay set of less than 0.05, the achromat is configured as a doublet, and wherein if a ratio of the diameter of the lenses of the relay set to the entire length of the relay set is greater than 0.05, the achromat is configured as a triplet.

13. The relay set according to claim 4, wherein the Z-factor for the at least one lens of the achromat not made of ED glass is less than 0.04, wherein the Z-factor is determined by the formula $$Z = \frac{1}{2}\left|\frac{D_s}{2\cdot(|R_s|+T)} - \frac{D_l}{2\cdot|R_l|}\right|$$

wherein, $R_s$ is the smaller of two radii of curvature of the at least one lens, $R_l$ is the larger of the two radii of curvature, $D_s$ is an outer diameter of the at least one lens on the side of the boundary surface with the smaller radius of curvature, $D_l$ is the diameter of the at least one lens on the side of the boundary surface with the larger radius of curvature, and T is the central thickness of the at least one lens.

14. The endoscope according to claim 8, wherein at least one additional relay set is configured differently with respect to other of the plurality of relay sets.

15. The endoscope according to claim 8, wherein the endoscope is one of a laparoscope or uroscope.

16. The endoscope according to claim 8, wherein a correction of a chromatic aberration achieved by the achromat of the relay set compensates for a chromatic aberration created by the lenses of the relay set, and the correction also compensates for a part of a chromatic aberration created by objective lenses and/or ocular lenses of the endoscope.

17. The relay set according to claim 11, wherein, in the case of the achromat configured as a triplet, the relay set is configured to be symmetric around a central plane, which runs through the central lens of the achromat.

\* \* \* \* \*